(12) United States Patent
Maeda et al.

(10) Patent No.: US 7,616,629 B2
(45) Date of Patent: Nov. 10, 2009

(54) MOBILE DEVICE, CONTENT DISTRIBUTION SYSTEM, AND CONTENT DISTRIBUTION METHOD

(75) Inventors: Kenichi Maeda, Mitaka (JP); Takayuki Orii, Chigasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 646 days.

(21) Appl. No.: 11/326,494

(22) Filed: Jan. 6, 2006

(65) Prior Publication Data
US 2006/0171340 A1 Aug. 3, 2006

(30) Foreign Application Priority Data
Jan. 6, 2005 (JP) .............................. 2005-001825

(51) Int. Cl.
*H04L 12/50* (2006.01)
*H04L 12/58* (2006.01)
*H04M 1/725* (2006.01)
(52) U.S. Cl. .................. 370/381; 455/412.1; 455/412.2
(58) Field of Classification Search ................. 370/381; 455/412.1, 412.2; 709/207
See application file for complete search history.

(56) References Cited

U.S. PATENT DOCUMENTS 7,290,034 B2 * 10/2007 Budd et al. ................. 709/206

| | | | |
|---|---|---|---|
| 2002/0007401 A1* | 1/2002 | Suzuki | 709/207 |
| 2002/0046299 A1 | 4/2002 | Lefeber et al. | |
| 2005/0041652 A1* | 2/2005 | Roy | 370/381 |

FOREIGN PATENT DOCUMENTS

| JP | 2000-201156 | 7/2000 |
|---|---|---|
| WO | WO 02/07397 A1 | 1/2002 |

* cited by examiner

*Primary Examiner*—Barry W Taylor
(74) *Attorney, Agent, or Firm*—Oblon, Spivak, McClelland, Maier & Neustadt, L.L.P.

(57) ABSTRACT

The present invention provides a mobile device that is able to receive content of a server even before a predetermined time interval elapses.

The mobile device comprises a first transmission portion, which transmits a content transmission request to a first server, a second transmission portion, which transmits a content transmission request to a second server, a transmission control portion, which outputs transmission instruction information ordering the transmission of a content transmission request to the first transmission portion and second transmission portion, and a notice reception portion, which receives an urgent notice that is transmitted from the first server. The transmission control portion outputs transmission instruction information to the first transmission portion at a predetermined first time interval or when the notice reception portion receives the urgent notice, and outputs transmission instruction information to the second transmission portion at a second predetermined time interval.

8 Claims, 6 Drawing Sheets

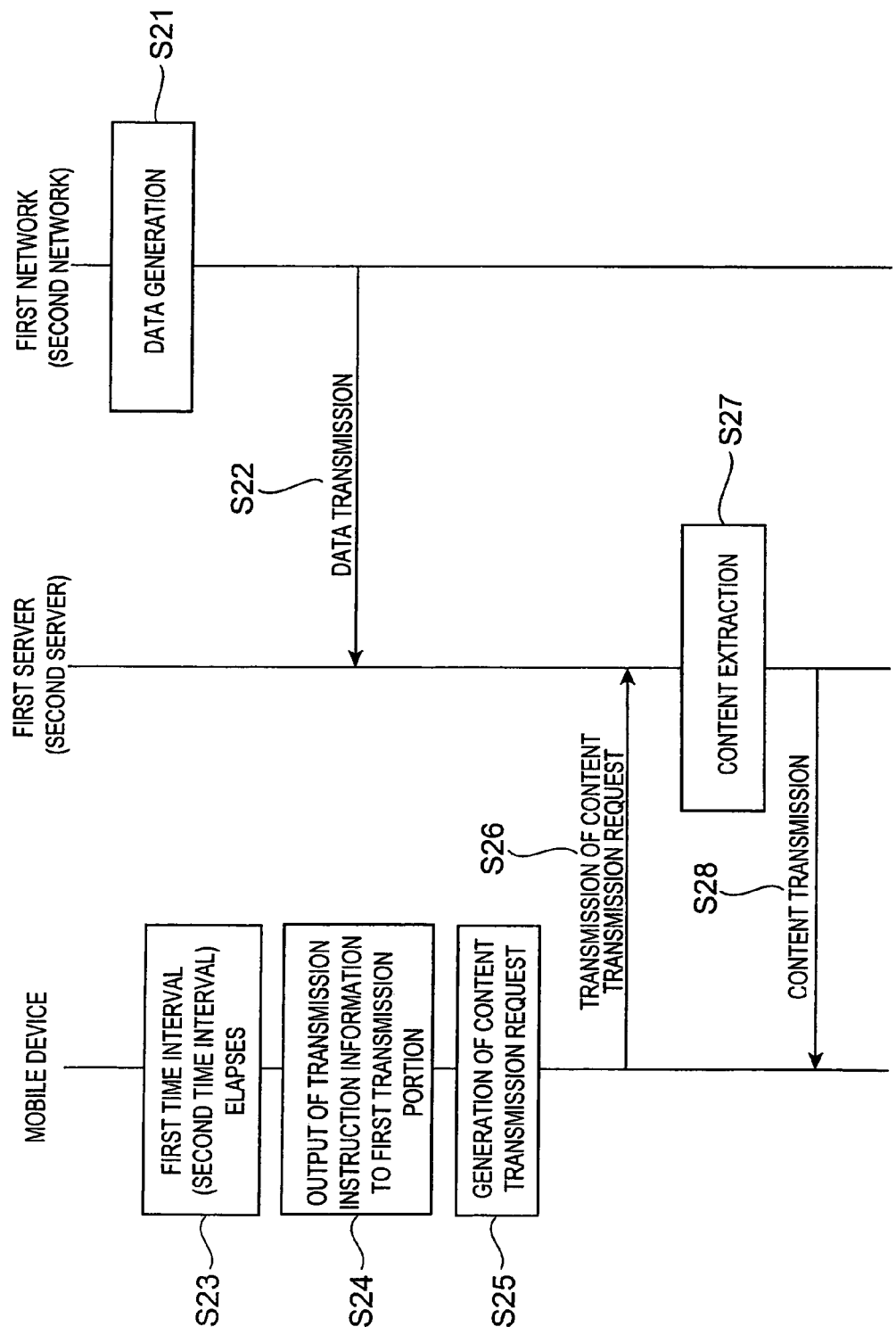

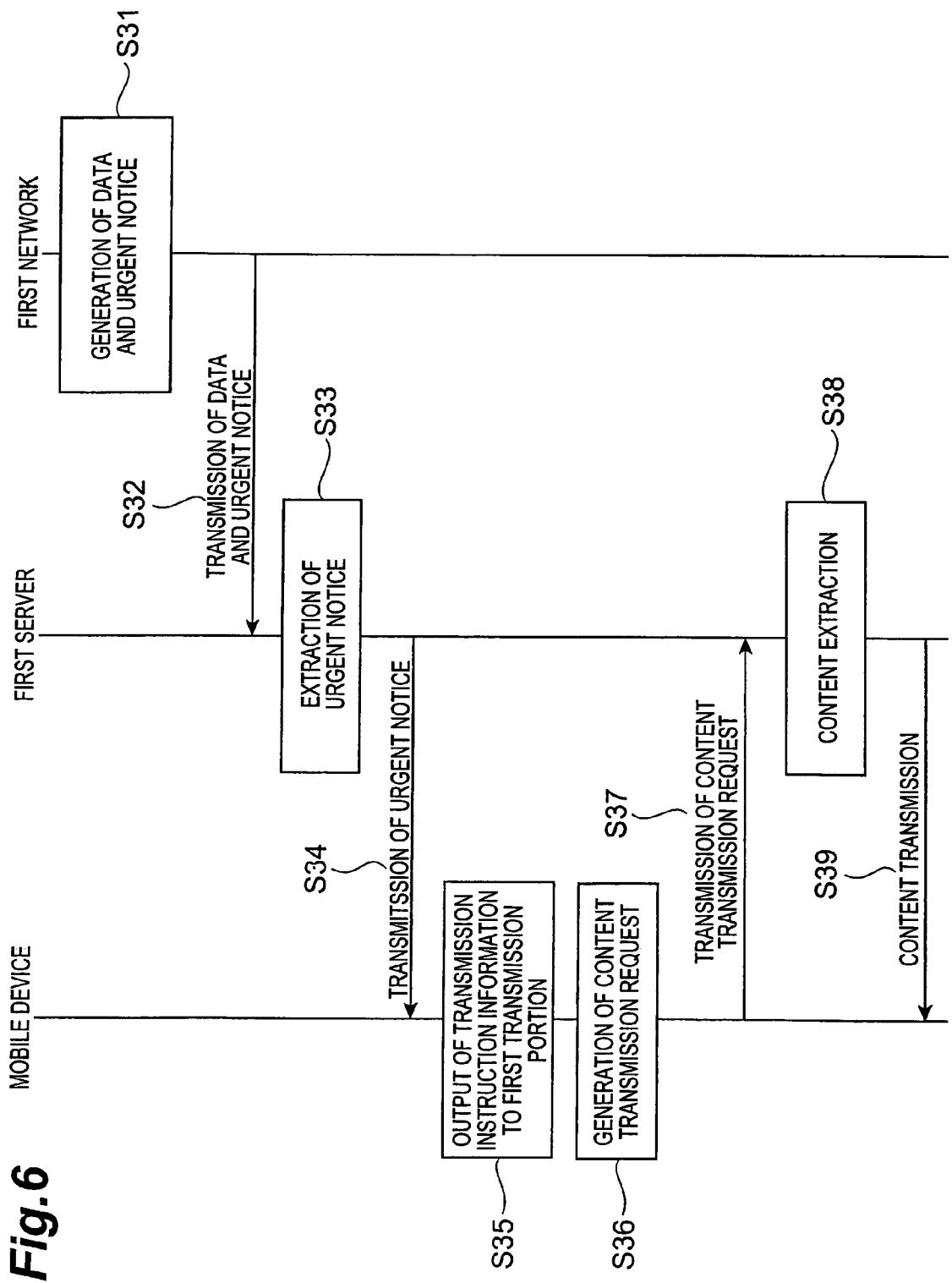

MOBILE DEVICE, CONTENT DISTRIBUTION SYSTEM, AND CONTENT DISTRIBUTION METHOD

BACKGROUND OF THE INVENTION

1. Field of the Invention

The present invention relates to a mobile device, content distribution system, and content distribution method.

2. Description of the Related Art

A method in which, when content that is provided via a network such as the Internet is obtained by using a mobile device such as a cellular phone, the user of the mobile device (subscriber) operates the mobile device to issue a request to a server installed by the content provider to distribute content and the accordingly distributed content is monitored, is typical. In recent years, in addition to this typical method, a method that regularly updates content that is pre-selected by the user even when the user does not operate the mobile device has also been considered. This method involves a request to transmit content being issued from the mobile device of the user to the server (depending on the case, a plurality of servers) of the content provider at a predetermined time interval.

Further, in a network that is constructed through integration of a plurality of computers, procedures such as poling are known as processing in which one host computer confirms a request to transmit data to a plurality of terminal computers (see Japanese Patent Application Laid Open No. 2000-201156, for example).

In the technology above, even in cases where a content provider wishes to transmit urgent content to users, for example, the server is unable to transmit content unless the users themselves request transmission to the server by operating their mobile devices until a predetermined time interval (that is, poling cycle) has elapsed.

SUMMARY OF THE INVENTION

Therefore, an object of the present invention is to provide a mobile device, content distribution system, and content distribution method that make it possible to receive content at the time the intentions of the content provider are reflected.

The mobile device of the present invention is a mobile device that receives and displays content transmitted from a first server and a second server respectively, comprising: first transmitting means for transmitting a content transmission request requesting the transmission of the content to the first server; second transmitting means for transmitting a content transmission request requesting the transmission of the content to the second server; transmission control means for outputting transmission instruction information ordering the transmission of the content transmission request to the first transmitting means and the second transmitting means; and notice receiving means for receiving an urgent notice ordering the acquisition of the content transmitted from the first server, wherein the transmission control means outputs the transmission instruction information to the first transmitting means at a predetermined first time interval or when the notice receiving means receives the urgent notice, and outputs the transmission instruction information at a predetermined second time interval to the second transmitting means.

According to the mobile device of the present invention, when the mobile device receives an urgent notice that is transmitted from the first server, the mobile device issues a request to the first server to transmit content. Therefore, the mobile device is able to request the distribution of content in accordance with an instruction from the first server even before a time interval that is determined beforehand by the mobile device has elapsed. In addition, the mobile device transmits a content transmission request only in accordance with an urgent notice that is transmitted from the first server. Therefore, even when an urgent notice is transmitted from the second server, for example, a content transmission request is not transmitted. Hence, it is possible to distinguish between a server whose urgent-notice instruction is to be followed and a server whose urgent-notice instruction is not to be followed.

Furthermore, the mobile device of the present invention may be constituted comprising first time interval changing means for changing the first time interval. Likewise, the mobile device of the present invention may be constituted comprising second time interval changing means for changing the second time interval. As a result, content can be transmitted to the servers at a time interval that is optionally set by the user.

The content distribution system of the present invention comprises a first server that transmits first content and an urgent notice ordering the acquisition of the content; a second server that transmits second content; a mobile device for receiving and displaying the first content and the second content, which comprises first transmitting means for transmitting a content transmission request requesting the transmission of the first content to the first server, second transmitting means for transmitting a content transmission request requesting the transmission of the second content to the second server, transmission control means for outputting transmission instruction information that orders the transmission of the content transmission request to the first transmitting means and the second transmitting means; and receiving means for receiving the first content and the urgent notice transmitted from the first server and receiving the second content transmitted from the second server, and in which the transmission control means outputs the transmission instruction information to the first transmitting means at a predetermined first time interval or when the receiving means receives the urgent notice, and outputs the transmission instruction information at a predetermined second time interval to the second transmitting means, wherein the first server transmits the first content to the receiving means of the mobile device upon receipt of the content transmission request transmitted from the first transmitting means of the mobile device; and the second server transmits the second content to the receiving means of the mobile device upon receipt of the content transmission request transmitted from the second transmitting means of the mobile device.

According to the content distribution system of the present invention, as per the case of the invention of the mobile device above, when the mobile device receives an urgent notice that is transmitted from the first server, the mobile device issues a request to the first server to transmit content. Therefore, even before a time interval that is determined beforehand by the mobile device has elapsed, the mobile device is able to request the distribution of content in accordance with an instruction from the first server. In addition, the mobile device transmits the content transmission request only in accordance with an urgent notice that is transmitted from the first server. Therefore, even when an urgent notice is transmitted from the second server, for example, a content transmission request is not transmitted. Hence, it is possible to distinguish between a server that follows an urgent notice instruction and a server that does not follow such an instruction.

In the case of the content distribution system of the present invention, the first server further comprises: first data receiving means for receiving first data and the urgent notice that are transmitted from a server constituting a first network; first storing means for storing the first data; and first extracting means for extracting, as the first content, at least a portion of the first data stored by the first storing means, wherein the first server transmits the, first content that is extracted by the first extracting means and the urgent notice to the receiving means of the mobile device; and the second server comprises: second data receiving means for receiving second data that are transmitted from a server constituting a second network; second storing means for storing the second data; and second extracting means for extracting, as the second content, at least a portion of the second data stored by the second storing means, wherein the second server may transmit the second content that is extracted by the second extracting means to the receiving means of the mobile device. With such a constitution, the mobile device is able to receive only content from the first network with the first and second servers serving as relay servers that are interposed between the network and the mobile device.

Further, in the content distribution system of the present invention, the mobile device may further comprise first distributed content selecting means for selecting the first content that is extracted by the first extracting means of the first server; the first server may comprise first select content registering means for registering the first content selected by the first distributed content selecting means; and the first extracting means may extract data registered by the first storing means in accordance with the first content registered by the first select content registering means. Likewise, the mobile device may comprise second distributed content selecting means for selecting the second content that is extracted by the second extracting means of the second server; the second server may comprise second select content registering means for registering the second content selected by the second distributed content selecting means; and the second extracting means may extract data stored by the second storing means in accordance with the second content registered by the second select content registering means. With such a constitution, the user is able to individually select, content that the mobile device receives from the first server and content that the mobile device receives from the second server and then register the content in each server.

Further, in addition to what can be said for the invention of the content distribution system as mentioned above, the same is true for the invention of the content distribution method as detailed below. The two inventions differ only in category and are substantially the same inventions that exhibit similar actions and effects.

The content distribution method of the present invention 8 is a content distribution method of a system that comprises a first server that transmits first content and an urgent notice ordering the acquisition of the content, a second server that transmits second content, and a mobile device that receives and displays the first content and the second content, comprising: a first transmission step in which the first transmitting means of the mobile device transmits a content transmission request requesting the transmission of the first content to the first server; a second transmission step in which the second transmitting means of the mobile device transmits a content transmission request requesting the transmission of the second content to the second server; a transmission control step in which transmission control means of the mobile device outputs transmission instruction information ordering the transmission of the content transmission request to the first transmitting means or the second transmitting means; a first content transmission step in which the first server transmits the first content to the receiving means of the mobile device upon receipt of the content transmission request transmitted from the first transmitting means of the mobile device; a second content transmission step in which the second server transmits the second content to the receiving means of the mobile device upon receipt of the content transmission request transmitted from the second transmitting means of the mobile device; and a receiving step in which the receiving means of the mobile device receives the first content and the urgent notice that are transmitted from the first server or receives the second content that is transmitted from the second server, wherein, in the transmission control step, the transmission control means of the mobile device outputs the transmission instruction information to the first transmitting means at a predetermined first time interval or when the receiving means of the mobile device receives the urgent notice, and the transmission control means of the mobile device outputs the transmission instruction information to the second transmitting means at a predetermined second time interval.

According to the present invention, the mobile device is able to receive content in accordance with a request from the server side even before a time interval that is determined beforehand by the mobile device has elapsed. Therefore, the mobile device is able to receive content at the time the intentions of the content provider are reflected.

BRIEF DESCRIPTION OF THE DRAWINGS

FIG. 5 serves to illustrate the procedure when the mobile device acquires content at a predetermined time interval in the content distribution according to the second embodiment; and FIG. 6 illustrates the procedure when the mobile device that has received an urgent notice acquires content in the content distribution of the second embodiment.

DESCRIPTION OF THE PREFERRED EMBODIMENTS

The findings of the present invention can be easily understood by considering the following detailed description with reference to the attached drawings that are shown only for the sake of exemplification. Embodiments of the present invention will be described successively with reference to the attached drawings. Where possible, the same codes have been assigned to the same parts and repetitive description is avoided.

First Embodiment

Figure 1:
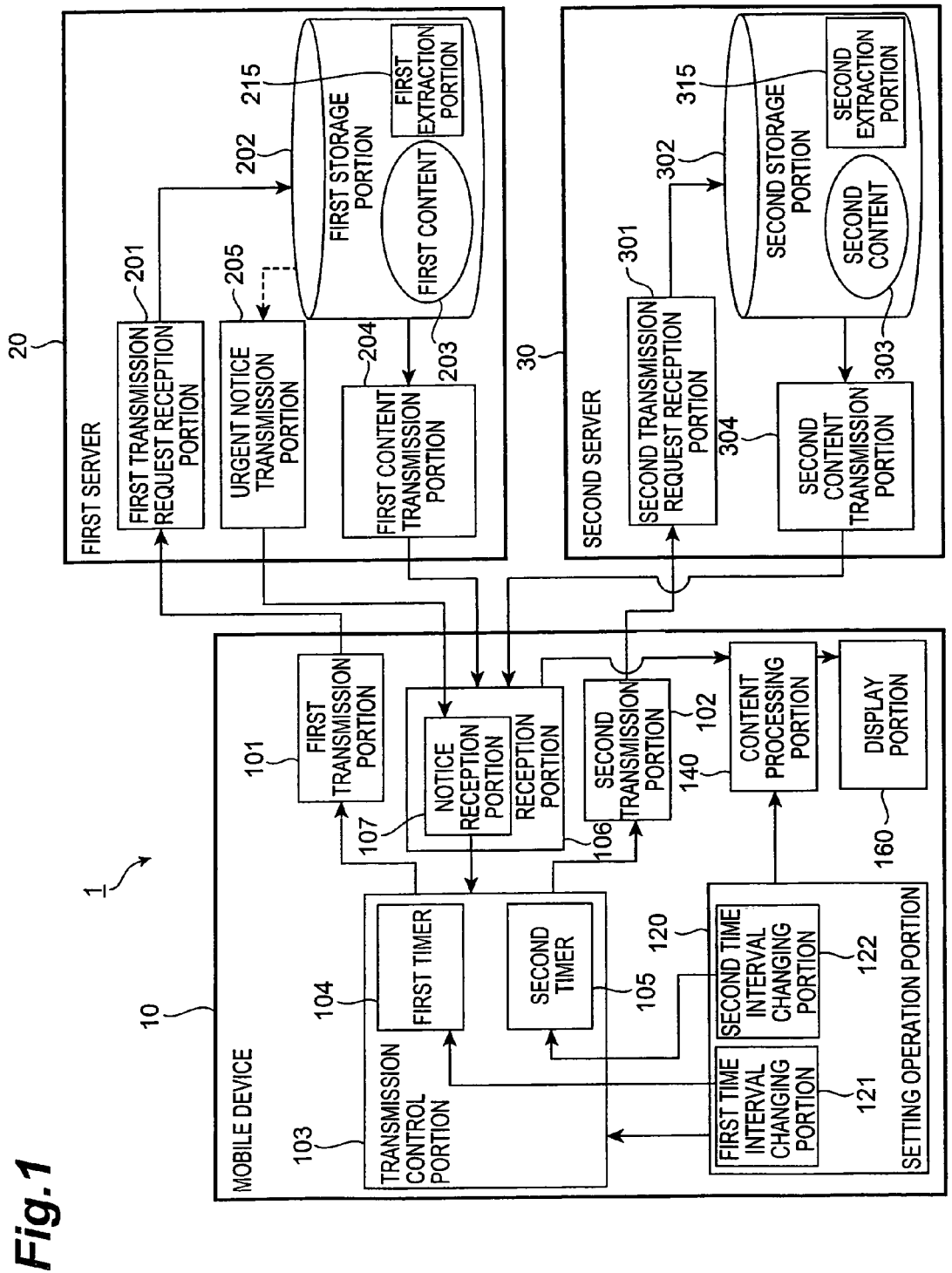
FIG. 1 shows the constitution of the content distribution system according to the first embodiment.
Figure 2:
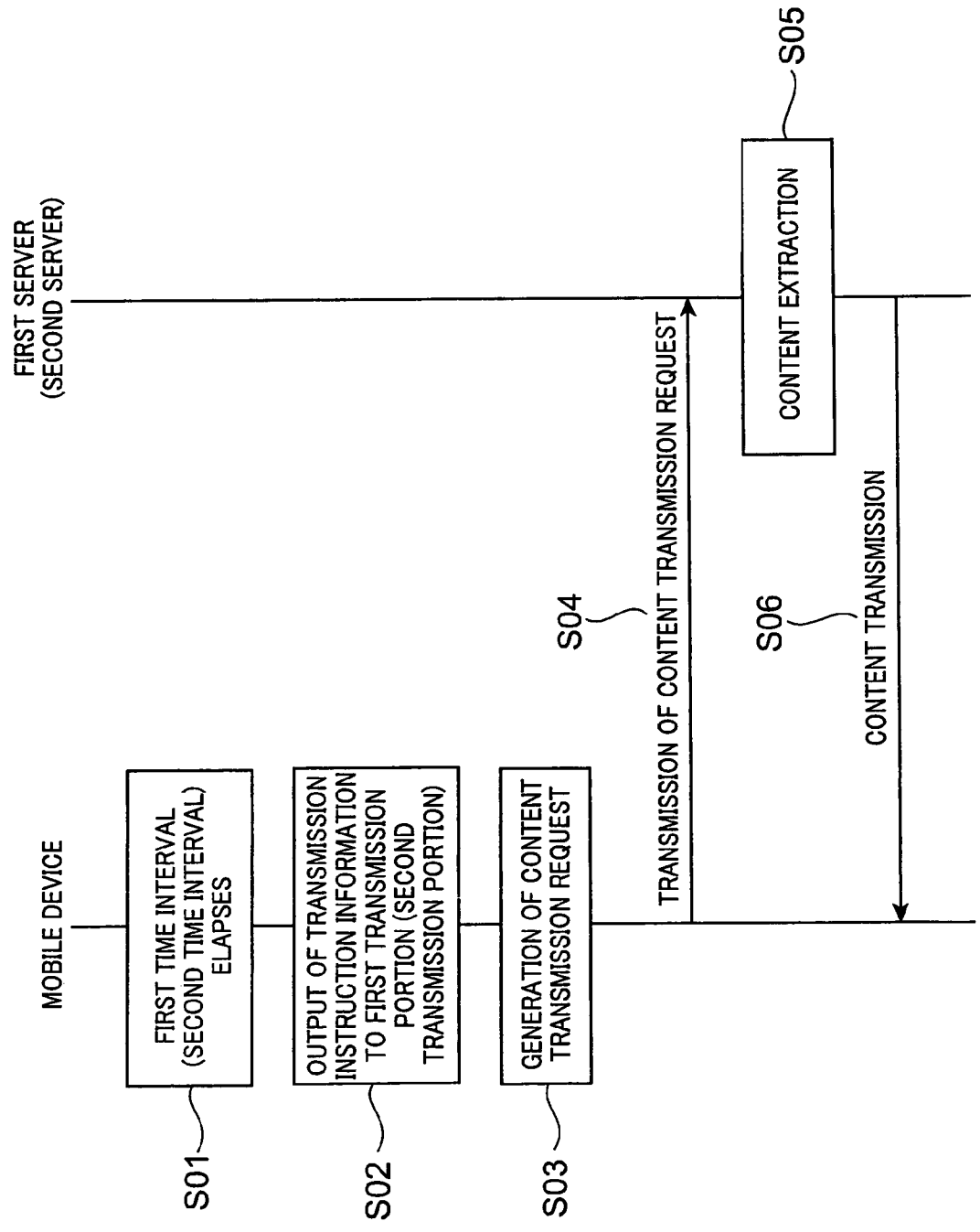
FIG. 2 illustrates the procedure when the mobile device acquires content at a predetermined time interval in the content distribution of the first embodiment.
Figure 3:
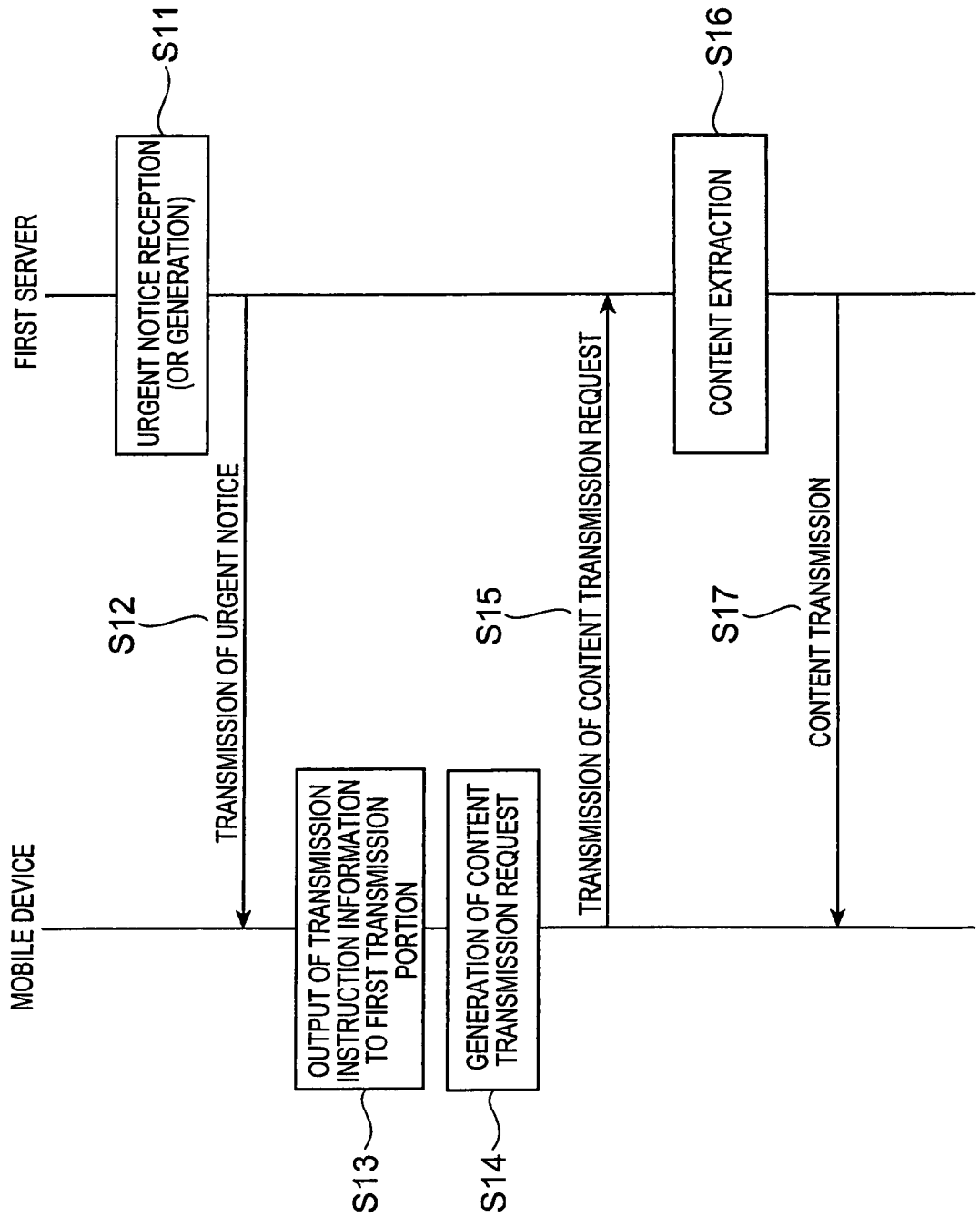
FIG. 3 serves to illustrate the procedure when a mobile device that has received an urgent notice acquires content in the content distribution of the first embodiment.

The content distribution system of the first embodiment will be described with reference to FIGS. 1 to 3.

First, the constitution of the content distribution system of the first embodiment will be described with reference to FIG. 1. A content distribution system 1 shown in FIG. 1 comprises a mobile device 10, a first server 20 and a second server 30, which are constituted capable to mutual information communication.

The mobile device 10 is an information communication terminal that is used by the user, examples of which include a cellular phone or a PDA with a communication function.

The mobile device 10 comprises, as functional constituent elements, a first transmission portion 101 (first transmitting means), a second transmission portion 102 (second transmitting means), a transmission control portion 103 (third control means), a reception portion 106 (receiving means), a setting operation portion 120, a content processing portion 140, and a display portion 160. In addition, the setting operation portion 120 comprises a first time interval changing portion 121 (first time interval changing means), and a second time interval changing portion 122 (second time interval changing means), and the transmission control portion 103 comprises a first timer 104 and a second timer 105. Further, the reception portion 106 comprises a notice reception portion 107 (notice receiving means).

The functions and operation of each of the elements that constitute the mobile device 10 will now be described in succession.

The first transmission portion 101 is a part that transmits a content transmission request requesting the transmission of content to the first server 20. Likewise, the second transmission portion 102 is a part that transmits a content transmission request to the second server 30. The first transmission portion 101 and second transmission portion 102 receive an input of transmission instruction information that is outputted from the transmission control portion 103 and transmit the content transmission request to the respective servers 20 and 30.

The transmission control portion 103 outputs transmission instruction information to the first transmission portion 101 or second transmission portion 102 in the following cases:
1) when an output is made to the first transmission portion 101 at the first time interval that is determined beforehand by the first timer 104;
2) when an output is made to the second transmission portion 102 at the second time interval that is determined beforehand by the second timer 105;
3) when an output is made to the first transmission portion 101 as a result of the notice reception portion 107 receiving an urgent notice ordering the acquisition of content that is transmitted from the first server 20;
4) when an output is made to the first transmission portion 101 as a result of the user operating the setting operation portion 120 of the mobile device; and
5) when an output is made to the second transmission portion 102 as a result of the user operating the setting operation portion 120 of the mobile device.

The first timer 104 operates the transmission control portion 103 to transmit transmission instruction information to the first transmission portion 101 at the predetermined first time interval. Likewise, the second timer 105 operates the transmission control portion 103 to transmit the transmission instruction information to the second transmission portion 102 at the predetermined second time interval.

The reception portion 106 is a part that receives first content that is transmitted from the first server 20 and second content that is transmitted from the second server 30. The received content is outputted to the content processing portion 140. The notice reception portion 107 of the reception portion 106 is a part that receives an urgent notice that is transmitted from the first server 20 and the received urgent notice is outputted to the transmission control portion 103.

The setting operation portion 120 outputs an instruction relating to the output of the transmission instruction information by the transmission control portion 103 and an instruction to display content stored in the content processing portion 140 on the display portion 160 in accordance with operation by the user. Further, the first time interval changing portion 121 is able to change the first time interval set by the first timer 104. Likewise, the second time interval changing portion 122 is able to change the second time interval set by the second timer 105. Further, the time interval changing may allow only one of the first time interval and second time interval, and the width of the time interval may be set arbitrarily in a predetermined range such as from one minute to two weeks. For example, the first timer 104 may be set with an initial value of three hours and the second timer 105 may be constituted so that the user can make an arbitrary selection from a variety of time intervals between one minute and two weeks.

The content processing portion 140 stores content inputted via the reception portion 106 from the first server 20 and second server 30 and outputs the stored content to the display portion on the basis of instructions from the setting operation portion 120. The display portion 160 displays the content that is outputted from the content processing portion 140.

The constitution of the first server 20 will be described next. The first server 20 is a system constituted by a computer or a plurality of computers that supply data and functions and so forth to the mobile device 10. The first server 20 comprises a CPU (central processing unit), a memory, an inputting device such as a mouse or keyboard, a display device such as a display, and a storage device such as a hard disk, and the like (none of which is illustrated).

The first server 20 comprises, as functional constituent elements, a first transmission request reception portion 201, a first storage portion 202 that stores first content 203, a first content transmission portion 204, and an urgent notice transmission portion 205. The first storage portion 202 comprises a first extraction portion 215.

The first transmission request reception portion 201 is a part that receives a content transmission request from the first transmission portion 101 of the mobile device 10 and outputs the content transmission request to the first storage portion. The first storage portion 202 receives the content transmission request and outputs first content 203 to a second content transmission portion 304. The first extraction portion 215 of the first storage portion 202 is a part that extracts the first content 203 transmitted to the mobile device 10 from the data stored by the first storage portion 202 in accordance with the reception of the content transmission request. The first content transmission portion 204 transmits the extracted first content 203 to the reception portion 106 of the mobile device 10.

The urgent notice transmission portion 205 transmits an urgent notice ordering the mobile device 10 to acquire content from the first server 20 to the notice reception portion 107 of the mobile device 10. For example, the first server 20 can be constituted such that the urgent notice transmission portion 205 transmits an urgent notice to the mobile device 10 in the following cases:
1) when the first server 20 receives an urgent-notice transmission, instruction from outside (from another server or information communication terminal or the like);
2) when the first storage portion 202 of the first server 20 stores content that includes data relating to an urgent notice from the content information provider; and
3) when the first storage portion 202 of the first server 20 stores content that is determined beforehand by the user.

The constitution of the second server 30 will be described next. The constitution of the second server 30 is the same as that of the first server except for the fact that there is no urgent notice transmission portion 205 in the first server 20. The transmission request reception portion, storage portion, extraction portion, and content transmission portion, which are elements with the same names except for the ordinal part have the same functions as the corresponding elements of the first server 20. More specifically, a second transmission request reception portion 301 receives a content transmission request from the second transmission portion 102 of the mobile device 10. When the second transmission request reception portion 301 receives the content transmission request, a second extraction portion 315 of a second storage portion 302 extracts second content 303 that is transmitted to the mobile device 10. The second storage portion 302 outputs the extracted second content 303 to the second content transmission portion 304 and the second content transmission portion 304 transmits the second content 303 to the reception portion 106 of the mobile device 10.

The operation of the content distribution system 1 will be described next with reference to FIGS. 2 and 3. First, a case where the mobile device acquires content at a predetermined time interval will be described by using FIG. 2. When the first time interval, which is determined beforehand from a time that constitutes a starting point such as when the power of the mobile device 10 is turned ON, when content is finally acquired, or when the date is changed, has elapsed in the first timer 104 (SO1), the transmission control portion 103 outputs transmission instruction information to the first transmission portion 101 (S02). The first transmission portion 101 receives an input of transmission instruction information, generates a content transmission request that asks the first server 20 to transmit content (S03), and transmits a content transmission request to the first transmission request reception portion 201 of the first server 20 (S04). The first extraction portion 215 of the first storage portion 202 extracts the first content 203, which is to be transmitted to the mobile device 10, from stored data in accordance with the reception of the content transmission request by the first transmission request reception portion 201 (S05). Further, the first extraction portion 215 extracts content that is designated by the information communication network provider, the user, or the content provider. The first content transmission portion 204 transmits the extracted first content 203 to the reception portion 106 of the mobile device 10 (S06).

Although a case where the mobile device 10 acquires the first content 203 stored in the first server 20 at the first time interval is described here, the same is true for a case where the mobile device 10 acquires the second content 303 stored in the second server 30 at the second time interval. More specifically, the first transmission portion 101 is replaced with the second transmission portion 102, the first timer 104 is replaced with the second timer 105, the first transmission request reception portion 201 is replaced with the second transmission request reception portion 301, the first storage portion 202 is replaced with the second storage portion 302, the first content 203 is replaced with the second content 303, the first content transmission portion 204 is replaced with the second content transmission portion 304, and the first extraction portion 215 is replaced with the second extraction portion 315 in the above description, and the operation shown in FIG. 2 is performed.

A case where the mobile device 10, which has received an urgent notice from the first server 20, acquires content will be described next by using FIG. 3. First, the first server 20 receives an urgent notice from outside ordering the mobile device 10 to acquire content or generates an urgent notice on the basis of content that is stored in the first storage portion 202 (S11). The urgent notice transmission portion 205 transmits the received or generated urgent notice to the notice reception portion 107 provided in the reception portion 106 of the mobile device 10 (S12). The transmission control portion 103 outputs transmission instruction information to the first transmission portion 101 in accordance with the reception of the urgent notice by the notice reception portion 107 (S13). The first transmission portion 101 receives the input of the transmission instruction information and generates a content transmission request that asks the first server 20 to transmit content (S14) and transmits the content transmission request to the first transmission request reception portion 201 of the first server 20 (S15). The first storage portion 202 extracts first content 203 (content containing at least content corresponding to an urgent notice), which is to be transmitted to the user of the mobile device 10, from stored data in accordance with the reception of the content transmission request by the first transmission request reception portion 201 (S16). The first content transmission portion 204 transmits the extracted first content 203 to the reception portion 106 of the mobile device 10 (S17).

As a result of such a constitution, in the content distribution system 1 of the mobile device of the first embodiment, the mobile device 10 is able to request that the first server 20 transmit content upon receiving an urgent notice that is transmitted from the first server 20. Therefore, even before the first time interval determined beforehand in the mobile device 10 has elapsed, the mobile device 10 is able to request the distribution of content in accordance with an instruction from the first server 20 (that is, the aims of the information communication network provider, user, or content provider). In addition, the mobile device 10 transmits a content transmission request only in accordance with an urgent notice that is transmitted from the first server 20 and, therefore, even when an urgent notice is transmitted from the second server, for example, the mobile device 10 does not transmit a content transmission request. Hence, it is possible to distinguish between a server whose urgent-notice instruction is to be followed (the first server 20 in this embodiment) and a server whose urgent-notice instruction is not to be followed (the second server 30 in this embodiment).

Further, although a case where the mobile device 10 transmits a content transmission request to a server in accordance with a first time interval, second time interval, or an urgent notice to acquire content has mainly been described here, a constitution is also possible in which a content transmission request can be transmitted to the first server 20 or the second server 30 as a result of the user operating the setting operation portion 120 of the mobile device 10.

Figure 4:
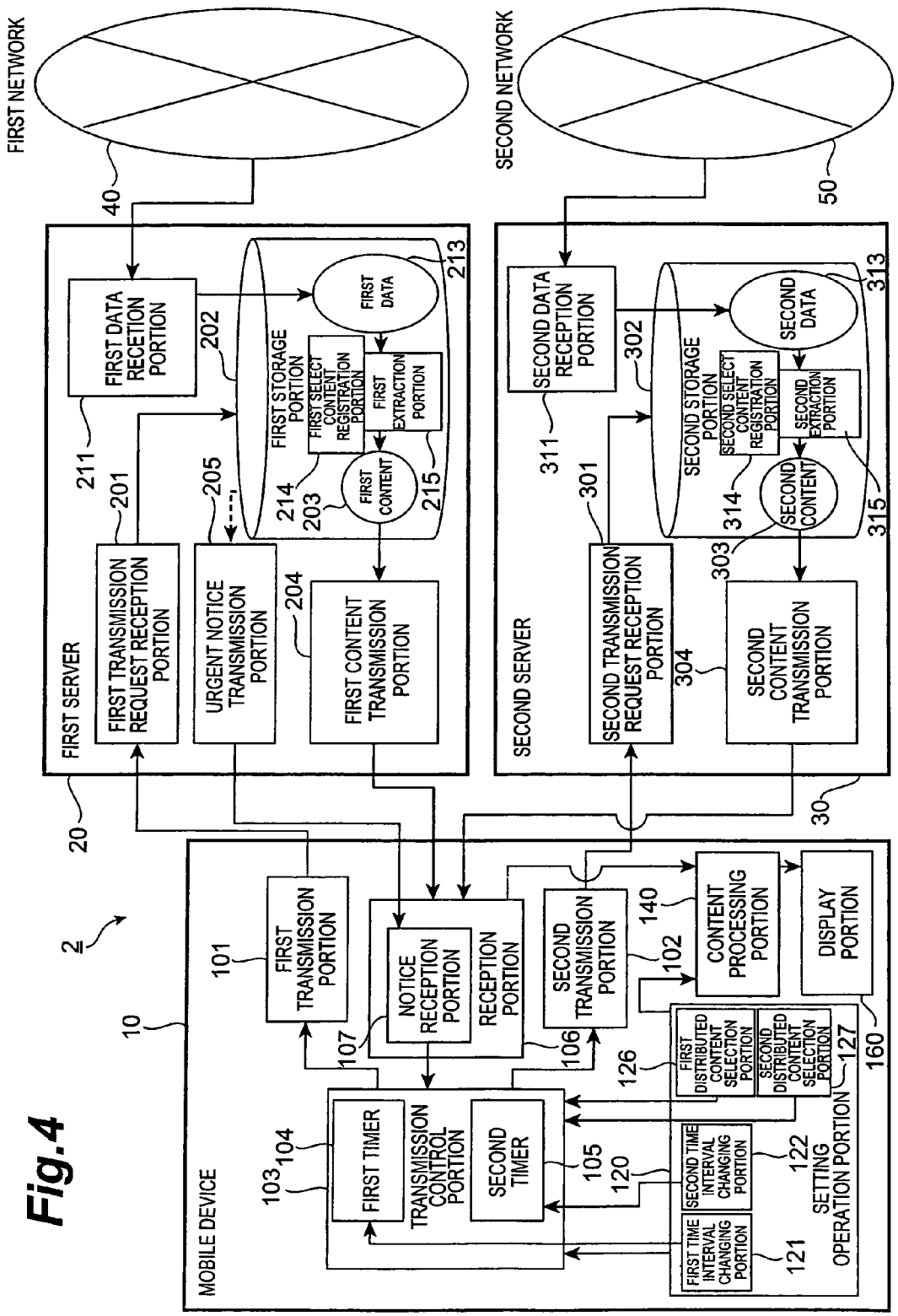
FIG. 4 shows the constitution of the content distribution system according to a second embodiment.

The content distribution system of the second embodiment will be described next with reference to FIGS. 4 to 6.

First, the constitution of a content distribution system 2 of the second embodiment will be described with reference to FIG. 4. The content distribution system 2 shown in FIG. 4 has the same constitution as that of the content distribution system 1 according to the first embodiment except for one part. That is, the fact that the content distribution system 2 of the second embodiment comprises a first network 40 and a second network 50 makes the content distribution system 2 differ from the content distribution system 1 of the first embodiment. The first network 40 and second network 50 are constituted by network elements such as a server that is capable of distributing data that contains content, and the first network 40 is capable of communicating information mutually with the first server 20, while the second network 50 is capable of communicating information mutually with the second server 30.

In addition to these differences, the setting operation portion 120 of the mobile device 10 comprises a first distributed content selection portion 126 (first distributed content selecting means) for selecting content to be extracted from first data 213 in the first server 20 and registering information relating to the selected content in a first select content registration portion 214 of the first server 20. The first distributed content selection portion 126 transmits data relating to the content selection to the first server 20 via the transmission control portion 103 and first transmission portion 101 and registers the data in the first select content registration portion 214 of the first storage portion 202 via the first transmission request reception portion 201 (first select content registering means). Likewise, the setting operation portion 120 of the mobile device 10 comprises a second distributed content selection portion 127 (second distributed content selecting means) for selecting content to be extracted from second data 313 in the second server 30 and registering information relating to the selected content in a second select content registration portion 314 (second select content selecting means) of the second server 30.

In addition, the first server 20 further comprises a first data reception portion 211 (first data receiving means) that receives data from the first network 40. The first storage portion 202 further comprises the first select content registration portion 214 (first select content registering means) for registering content that is extracted by the first extraction portion 215 and stores the first data 213 received by the first data reception portion 211. Likewise, the second server 30 comprises a second data reception portion 311 (second data receiving means) that receives data from the second network 50. Further, the second storage portion 302 comprises the second select content registration portion 314 (second select content registering means) for registering content that is extracted by the second extraction portion 315 and stores the second data 313 that is received by the second data reception portion 311.

Further, the first data 213 and second data 313 mentioned here are data that are received by the first server 20 and second server 30 from a network element such as the server constituting the first network 40 or a network element such as the server constituting the second network 50. These data are referred to as the aggregate of the content-containing content that is transmitted to the mobile device 10. Further, the first storage portion 202 of the first server 20 and the second storage portion 302 of the second server 30 suitably change all or a portion of the received first data 213 and second data 313.

In addition to the description above, for the content distribution system 2 of the second embodiment, the same symbols have been assigned to constituent elements with the same functions as those of the content distribution system 1 of the first embodiment, whereby repetitive descriptions are avoided.

The operation of the content distribution system 2 will be described next with reference to FIGS. 5 and 6. First, a case where the mobile device acquires content at a predetermined time interval will be described by using FIG. 5. A network element (server or the like) of the first network 40 generates data (S21) and transmits the generated data to the first data reception portion 211 of the first server 20 (S22).

When the first time interval, which is determined beforehand from a time that constitutes a starting point such as when the power of the mobile device 10 is turned ON, when content is finally acquired, or when the date is changed, has elapsed in the first timer 104 of the mobile device 10 (S23), the transmission control portion 103 outputs transmission instruction information to the first transmission portion 101 (S24). The first transmission portion 101 receives an input of transmission instruction information, generates a content transmission request that asks the first server 20 to transmit content (S25), and transmits a content transmission request to the first transmission request reception portion 201 of the first server 20 (S26). The first extraction portion of the first storage portion 202 extracts the first content 203, which is to be transmitted to the mobile device 10, from stored first data 213 on the basis of the registered content of the first select content registration portion 214 in accordance with the reception of the content transmission request by the first transmission request reception portion 201 (S27). The first content transmission portion 204 transmits the extracted first content 203 to the reception portion 106 of the mobile device 10 (S28).

Although a case where the mobile device 10 acquires the first content 203 stored in the first server 20 at the first time interval is described here, the same is true for a case where the mobile device 10 acquires the second content 303 stored in the second server 30 at the second time interval. More specifically, the first transmission portion 101 is replaced with the second transmission portion 102, the first timer 104 is replaced with the second timer 105, the first transmission request reception portion 201 is replaced with the second transmission request reception portion 301, the first storage portion 202 is replaced with the second storage portion 302, the first content 203 is replaced with the second content 303, the first content transmission portion 204 is replaced with the second content transmission portion 304, the first data reception portion 211 is replaced with the second data reception portion 311, the first select content registration portion 214 is replaced with the second select content registration portion 314, and the first extraction portion 215 is replaced with the second extraction portion 315 in the above description, and the operation shown in FIG. 5 is performed.

Furthermore, the cycle and time interval according to which the network element generates data and the cycle and time interval at which data is transmitted are not particularly limited and may be decided arbitrarily by the content provider. In addition, the first server 20 and second server 30 may be constituted to order the transmission of data to the corresponding first network 40 and second network 50 at optional time intervals.

Next, a case where data ordering the transmission of first data and an urgent notice is received by the first server 20 from the first network 40 and the mobile device 10, which has received the urgent notice via the first server 20, acquires content will be described by using FIG. 6. Further, the procedure shown in FIG. 6 is equivalent to '2) a case where content containing data relating to an urgent notice from the content information provider is stored in the first storage portion 202', which is an embodiment pertaining to the first server 20 of the first embodiment.

First, the network element (server or the like) of the first network 40 generates data and an urgent notice (S31) and the generated data and urgent notice are transmitted to the first data reception portion 211 of the first server 20 (S32). The first storage portion 202 extracts the urgent notice from the data that is received by the first data reception portion 211 (S33) and the urgent notice transmission portion 205 transmits the extracted urgent notice to the notice reception portion 107 provided in the reception portion 106 of the mobile device 10 (S34). The transmission control portion 103 outputs transmission instruction information to the first transmission portion 101 in accordance with the reception of the urgent notice by the notice reception portion 107 (S35). The first transmission portion 101 receives an input of transmission instruction information, generates a content transmission request that asks the first server 20 to transmit content (S36), and transmits the content transmission request to the first transmission request reception portion 201 of the first server 20 (S37). The first extraction portion 215 extracts first content 203 (which is content that contains at least content corresponding to an urgent notice and is not limited to content that is registered in the first select content registration portion 214), which is to be transmitted to the user of the mobile device 10, from the stored first data 213 in accordance with the reception of the content transmission request by the first transmission request reception portion 201 (S38). The first content transmission portion 204 transmits the extracted first content 203 to the reception portion 106 of the mobile device 10 (S39).

With such a constitution, in the case of the content distribution system 2 of the mobile device of the second embodiment, upon receiving an urgent notice that is transmitted from the first server 20, the mobile device 10 is able to request the transmission of content to the first server 20. Therefore, the mobile device 10 is able to request the distribution of content in accordance with an instruction from the first server 20 even before a first time interval that is determined beforehand by the mobile device has elapsed. In addition, the mobile device 10 transmits a content transmission request only in accordance with an urgent notice that is transmitted from the first server 20. Hence, it is possible to distinguish between a network whose urgent-notice instruction is to be followed (the first network 40 in this embodiment) and a network whose urgent-notice instruction is not to be followed (the second network 50 in this embodiment).

More specifically, when the content provider of the first network 40 wishes to distribute content of a highly urgent nature (special news, disaster information, travel information on trains and airplanes and so forth, for example), by transmitting the above urgent notice to the first server 20 together with the data, the mobile device 10 is able to issue a request to the first server storing the data transmitted from the first network 40 to distribute content even when the user does not operate the mobile device 10. Further, the mobile device 10 is able to individually handle each of the networks by transmitting a content transmission request only in accordance with an urgent notice that is transmitted from a predetermined network. For example, the first network 40 is constituted as a network comprising only a public-type site authorized by a telecommunications company and the second network 50 is constituted as a network comprising only a non-public site, whereby urgent notices can be handled according to the quality of the respective networks (reliability of the content and so forth).

Moreover, although a case where the number of servers is two was described in this embodiment by way of example, the number of servers in the content distribution system of the present invention may be three or more. In this case, there may be two or more servers that comprise the urgent notice transmission portion 205 for transmitting an urgent notice to the mobile device 10. There may similarly be three or more networks.

What is claimed is:

1. A mobile device that receives and displays content transmitted from a first server and a second server respectively, comprising:
   first transmitting means for transmitting a content transmission request requesting the transmission of the content to the first server;
   second transmitting means for transmitting a content transmission request requesting the transmission of the content to the second server;
   transmission control means for outputting transmission instruction information ordering the first transmitting means and the second transmitting means to transmit the content transmission request; and
   notice receiving means for receiving an urgent notice ordering the acquisition of the content transmitted from the first server,
   wherein the transmission control means outputs the transmission instruction information to the first transmitting means at a predetermined first time interval and when the notice receiving means receives the urgent notice, and outputs the transmission instruction information at a predetermined second time interval to the second transmitting means regardless of urgent notices received at the notice receiving means from the second server.

2. The mobile device according to claim 1, further comprising: first time interval changing means for changing the first time interval.

3. The mobile device according to claim 1, further comprising: second time interval changing means for changing the second time interval.

4. A content distribution system, comprising:
   a first server that transmits first content and an urgent notice ordering the acquisition of the content;
   a second server that transmits second content;
   a mobile device for receiving and displaying the first content and the second content, which comprises
      first transmitting means for transmitting a content transmission request requesting the transmission of the first content to the first server,
      second transmitting means for transmitting a content transmission request requesting the transmission of the second content to the second server,
      transmission control means for outputting transmission instruction information that orders the first transmitting means and the second transmitting means to transmit the content transmission request, and
      receiving means for receiving the first content and the urgent notice transmitted from the first server and receiving the second content transmitted from the second server, the transmission control means outputting the transmission instruction information to the first transmitting means at a predetermined first time interval and when the receiving means receives the urgent notice, and outputting the transmission instruction information at a predetermined second time interval to the second transmitting means regardless of urgent notices received by the receiving means from the second server, wherein
   the first server transmits the first content to the receiving means of the mobile device upon receipt of the content transmission request transmitted from the first transmitting means of the mobile device, and
   the second server transmits the second content to the receiving means of the mobile device upon receipt of the content transmission request transmitted from the second transmitting means of the mobile device.

5. The content distribution system according to claim 4, the first server further comprising:
   first data receiving means for receiving first data and the urgent notice that are transmitted from a server constituting a first network;
   first storing means for storing the first data; and
   first extracting means for extracting, as the first content, at least a portion of the first data stored by the first storing means,
   wherein the first server transmits the first content that is extracted by the first extracting means and the urgent notice to the receiving means of the mobile device, and the second server comprising:

second data receiving means for receiving second data that are transmitted from a server constituting a second network;

second storing means for storing the second data; and second extracting means for extracting, as the second content, at least a portion of the second data stored by the second storing means, wherein the second server transmits the second content that is extracted by the second extracting means to the receiving means of the mobile device.

6. The content distribution system according to claim 5, wherein the mobile device further comprises first distributed content selecting means for selecting the first content that is extracted by the first extracting means of the first server;

the first server comprises first select content registering means for registering the first content selected by the first distributed content selecting means; and the first extracting means extracts data registered by the first storing means in accordance with the first content registered by the first select content registering means.

7. The content distribution system according to claim 5 or 6, wherein the mobile device further comprises second distributed content selecting means for selecting the second content that is extracted by the second extracting means of the second server;

the second server comprises second select content registering means for registering the second content selected by the second distributed content selecting means; and the second extracting means extracts data stored by the second storing means in accordance with the second content registered by the second select content registering means.

8. A content distribution method in a system that comprises a first server that transmits first content and an urgent notice ordering the acquisition of the content, a second server that transmits second content, and a mobile device that receives and displays the first content and the second content, comprising:

a first transmission step in which the first transmitting means of the mobile device transmits a content transmission request requesting the transmission of the first content to the first server;

a second transmission step in which the second transmitting means of the mobile device transmits a content transmission request requesting the transmission of the second content to the second server;

a transmission control step in which transmission control means of the mobile device outputs transmission instruction information ordering the first transmitting means and the second transmitting means to transmit the content transmission request;

a first content transmission step in which the first server transmits the first content to the receiving means of the mobile device upon receipt of the content transmission request transmitted from the first transmitting means of the mobile device;

a second content transmission step in which the second server transmits the second content to the receiving means of the mobile device upon receipt of the content transmission request transmitted from the second transmitting means of the mobile device; and a receiving step in which the receiving means of the mobile device receives the first content and the urgent notice that are transmitted from the first server or receives the second content that is transmitted from the second server, wherein, in the transmission control step, the transmission control means of the mobile device outputs the transmission instruction information to the first transmitting means at a predetermined first time interval and when the receiving means of the mobile device receives the urgent notice, and the transmission control means of the mobile device outputs the transmission instruction information to the second transmitting means at a predetermined second time interval regardless of urgent notices received by the receiving means of the mobile device from the second server.

* * * * *